United States Patent
Seo (10) Patent No.: US 7,801,222 B2
(45) Date of Patent: Sep. 21, 2010

(54) CODING IMAGE SIGNAL (75) Inventor: Kwang-Deok Seo, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1460 days.

(21) Appl. No.: 11/171,968

(22) Filed: Jun. 29, 2005

(65) Prior Publication Data

US 2006/0002478 A1 Jan. 5, 2006

(30) Foreign Application Priority Data

Jun. 30, 2004 (KR) ........................ 10-2004-0050695

(51) Int. Cl.
*H04N 7/12* (2006.01)
*H04B 1/66* (2006.01)
(52) U.S. Cl. .................... 375/240.24; 348/416
(58) Field of Classification Search ................ 348/387, 348/385, 386, 388, 411, 412, 413, 414, 405, 348/404, 403, 419, 390, 384, 406, 420, 420.1, 348/425.1, 425.2, 408.1; 375/240.19, 240.24, 375/240.26, 240.01, 240.27, 240.12, 240.13
See application file for complete search history.

(56) References Cited

U.S. PATENT DOCUMENTS

| 5,550,590 | A | 8/1996 | Sakazawa et al. |
| 5,691,770 | A | 11/1997 | Keesman et al. |
| 6,067,118 | A | 5/2000 | Chen et al. |
| 2002/0118759 | A1 | 8/2002 | Enficiaud et al. |
| 2003/0007563 | A1 | 1/2003 | Ryu |

FOREIGN PATENT DOCUMENTS

| JP | 5167998 | 7/1993 |
| JP | 07115651 | 5/1995 |
| JP | 07-226935 | 8/1995 |

(Continued)

OTHER PUBLICATIONS

Mukherjee, D., "Combined Mode Selection and Macroblock Quantization Step Adaptation for the H.263 Video Encoder," vol. 2, pp. 37, 1997 International Conference on Image Processing (ICIP'97), 1997.

(Continued)

*Primary Examiner*—Behrooz Senfi
(74) *Attorney, Agent, or Firm*—Lee, Hong, Degerman, Kang & Waimey (57) ABSTRACT

The present invention relates to a method for encoding a signal of a wireless communication system, the method comprising dividing a current frame of the signal into a plurality of GOBs (Groups of Blocks) each having a certain size, determining whether a current GOB to be encoded of the plurality of GOBs is a first GOB of the current frame, calculating a control parameter value of the current GOB according to whether the current GOB is the first GOB of the current frame, controlling an encoding bit rate of the current GOB according to the control parameter value, and encoding the current GOB. Preferably, a hybrid method wherein an inter-frame GOB update method and an intra-frame GOB update method is used, so that a bit rate change between frames is reduced and data transmission of a channel is efficiently made to therefore provide a user with optimum image quality.

20 Claims, 3 Drawing Sheets

FOREIGN PATENT DOCUMENTS

| JP | 09-107293 | 4/1997 |
|---|---|---|
| JP | 10-248063 | 9/1998 |
| KR | 1020030042115 A | 5/2003 |
| KR | 10 2004 0045382 A | 6/2004 |

OTHER PUBLICATIONS

Wiegand, T., et al.; "Rate-Distortion Optimized Mode Selection for Very Low Bit Rate Video Coding and the Emerging H.263 Standard"; IEEE Transactions on Circuits and Systems for Video Technology, vol. 6, No. 2, Apr. 1996, pp. 182-190, XP011014299.

Zhang, R., et al.; "Video Coding with Optimal Inter/Intra-Mode Switching for Packet Loss Resilience"; IEEE Journal on Selected Areas in Communications, vol. 18, No. 6, Jun. 2000, pp. 966-976, XP011055155.

Wiegand, T., et al.; "Efficient Mode Selection for Block-Based Motion Compensated Video Coding"; IEEE Proceedings of the International Conference on Image Processing, vol. 2, Oct. 23, 1995, pp. 559-562, XP010197030.

CODING IMAGE SIGNAL

CROSS-REFERENCE TO RELATED APPLICATIONS

Pursuant to 35 U.S.C. §119(a), this application claims the benefit of earlier filing date and right of priority to Korean Application No. 2004-50695, filed on Jun. 30, 2004, the contents of which is hereby incorporated by reference herein in its entirety.

FIELD OF THE INVENTION

The present invention relates to encoding digitized video user equipment, and particularly, to encoding an image signal in user equipment after encoding the image signal by GOB (Group of Block) units.

BACKGROUND OF THE INVENTION

In general, encoding a moving image (video) signal for transmission in a mobile communication system is based on a H.263 video coding standard. A most commonly used method for controlling an encoding bit rate of the H.263 video encoding is the method proposed in TMN 5 (Test Model Near-term 5).

Although performing well with respect to the encoding bit rate, the method proposed in TMN 5 is disadvantageous with respect to maintaining the best image quality, specifically, minimizing distortion. This is because the selection of the macroblock encoding mode, such as INTRA, INTER, SKIP and the like, is determined based on a generated bit amount (i.e., coder output buffer occupancy) and not on distortion aspects.

As a way of compensating for the deficiencies in the TMN 5 method, a most representative and optimized method for controlling a bit rate in the related art R-D (Rate-Distortion) sense has been proposed by Thomas Wiegand et al. in "Rate-Distortion Optimized Mode Selection For Very Low Bit Rate Video Coding And The Emerging H.263 Standard", IEEE Transactions On Circuits And Systems For Video Technology, Vol. 6, No. 2, April, 1996. The aforementioned technique uses a coding control parameter (for selecting the encoding mode) determined in accordance with an R-D relationship, namely, the Lagrange multiplier ($\lambda$), not the quantization parameter.

Figure 1:
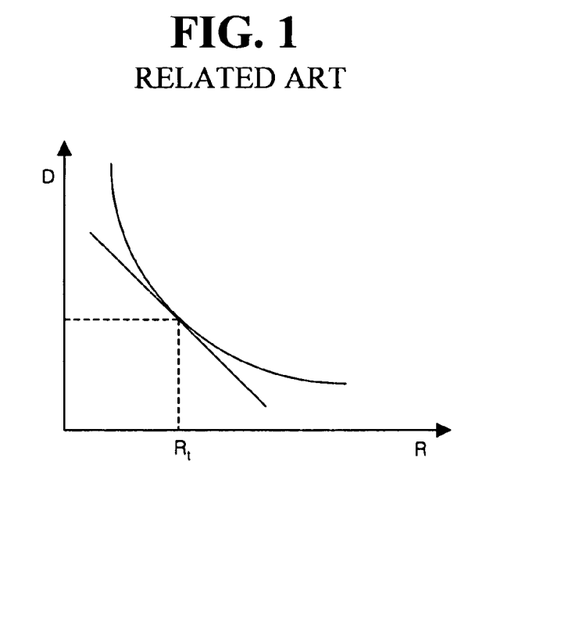
FIG. 1 is a graph illustrating a general Rate-Distortion (R-D) relationship.

FIG. 1 is a graph illustrating a general R-D relationship. As shown, if the target bit rate ($R_t$) is determined in the R-D relationship, which is obtained by characteristics of a frame, the Lagrange multiplier ($\lambda$) is determined. In contrast, if the Lagrange multiplier ($\lambda$) that corresponds to the negative slope of the function (curve) in the R-D graph is determined, then the corresponding bit rate and distortion are accordingly determined. This means that the bit rate may be controlled by using the Lagrange multiplier ($\lambda$).

Wiegand et al. proposes that the value of $\lambda$ may be dynamically obtained for each frame or each GOB (indexed by K) of a video sequence by the following equation (1).

$$\lambda_{k+1} = \lambda_k + \left(\frac{R_c}{R_k} - 1\right). \qquad \text{equation (1)}$$

In equation 1, k represents the order of the $k^{th}$ frame or GOB, and $\lambda^{k+1}$ represents the value of $\lambda$ for the k+1$^{th}$ frame or GOB. Also, $R_k$ represents the encoding bit rate generated by encoding the $k^{th}$ frame. $R^c$ represents the rate constraint, being the target bit rate required for the encoded frame or GOB.

In equation (1), the value of $\lambda$ for the current frame is determined by the encoding bit rate ($R_k$) generated by encoding the previous frame and the target bit rate ($R_t$) required for the encoded previous frame.

Figure 2:
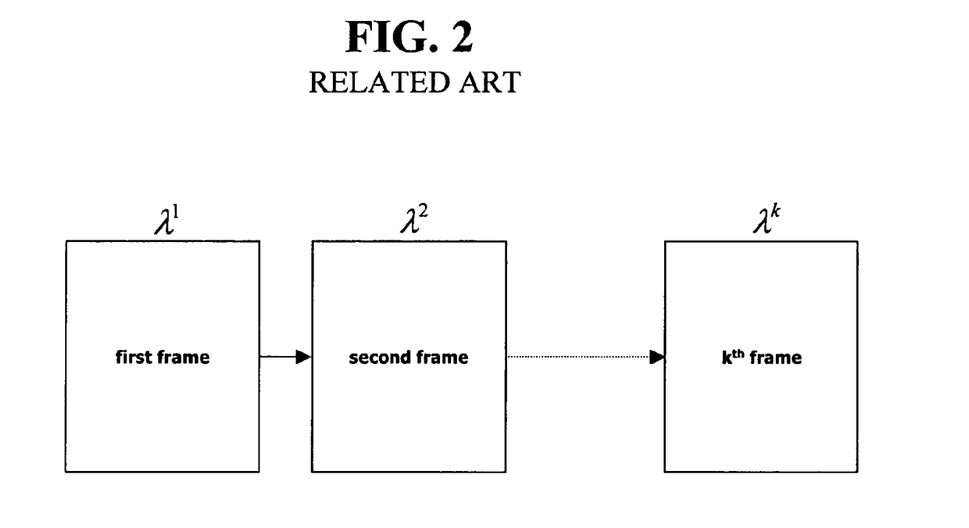
FIG. 2 is a diagram illustrating a method for updating the value of $\lambda$ for encoding an image signal in accordance with the related art.

FIG. 2 is a diagram illustrating the related art principle of an inter-frame $\lambda$ value update. As shown, the value of $\lambda$ is updated by an inter-frame update method in the related art. Namely, the encoded bit rate of a first frame is controlled on the basis of a value $\lambda^1$, and the encoded bit rate of a second frame is controlled on the basis of a value $\lambda^2$, which is obtained based on the value of $\lambda^1$. Accordingly, the encoding bit rate of the $k^{th}$ frame is controlled on the basis of a value $\lambda^k$, which is obtained based on the value of $\lambda^{k+1}$.

As mentioned above, the related art inter-frame coding parameter update method in which the value of $\lambda$ for the current frame is obtained based on the value of $\lambda$ used for a previous frame is advantageous in encoding an image signal with a low bit rate. Here, the bit rate is low when the characteristics of the image signal of the previous frame are almost the same as those of the current frame and there is little motion.

However, in the related art inter-frame coding parameter update method, if the bit rate to be used by units of a frame increases due to higher motion, an error in the generated bit rate undesirably increases. Thus, the bit rate cannot be effectively controlled thereby causing an image received by a receiver to be greatly changed in quality.

Specifically, the method in which the value of $\lambda$ is updated by units of a frame to control the target bit rate has the following problems. First, since the fluctuation in generated bit rates between frames can be great, the image quality can be very different frame by frame. Also, a decoder side requires a bigger-sized buffer. Furthermore, an image signal with high quality cannot be transmitted to a receiver.

SUMMARY OF THE INVENTION

The present invention is directed to encoding a signal of a wireless communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for encoding a signal of a wireless communication system, the method comprising dividing a current frame of the signal into a plurality of GOBs (Groups of Blocks) each having a certain size, determining whether a current GOB to be encoded of the plurality of GOBs is a first GOB of the current frame, calculating a control parameter value of the current GOB according to whether the current GOB is the first GOB of the current frame, controlling an encoding bit rate of the current GOB according to the control parameter value, and encoding the current GOB.

Preferably, the control parameter value of the current GOB is calculated based on a control parameter value of a first GOB of a previous frame of the signal if it is determined that the current GOB is the first GOB of the current frame. The control parameter value of the current GOB is calculated based on a control parameter value of a previous GOB of the current frame if it is determined that the current GOB is not the first GOB of the current frame.

In one aspect of the invention, the method further comprises updating a difference value between a total bit rate assigned to the current GOB and a target bit rate, updating the target bit rate, determining whether the current GOB is the last GOB of the current frame, and determining whether the current frame is the last frame of the signal if the current GOB is determined to be the last GOB of the current frame.

Preferably, the signal is a video signal. The control parameter is a Lagrange multiplier. The control parameter value corresponding to the first GOB of a first frame of the signal is arbitrarily assigned.

In another aspect of the invention, the encoding bit rate of the current GOB is controlled according to the equation $$\lambda_1^n = \lambda_1^{n-1} + \left( \frac{B_1^{n-1}}{B_{target}/g} - 1 \right)$$

where $\lambda^n_1$ is the control parameter for encoding the first GOB of the current frame ($n^{th}$ frame), $B^{n-1}_1$ is the encoding bit rate obtained by encoding the first GOB of a previous frame (n–1$^{th}$ frame), $B_{target}$ is the target bit rate of the current frame, and g is the number of GOBs of the current frame.

Preferably, the bit rate of the current GOB is controlled according to the control parameter value of a previous GOB within the current frame, the sum total of encoding bit rates encoded up to the previous GOB and a difference value between the total encoding bit rate encoded up to the previous GOB and a total target bit rate assigned up to the current GOB, for thereby reducing a bit rate variation between successive encoded frames.

The bit rate of the current GOB is controlled according to the equation $$\lambda_m^n = \lambda_{m-1}^n + \left( \frac{\sum_{k=1}^{m-1} B_k^n}{\frac{m-1}{g} B_{newtarget}} - 1 \right)$$

where $\lambda^n_{m-1}$ is the control parameter value for encoding the previous GOB, $$\sum_{k=1}^{m-1} B_k^n$$

is the sum total of encoding bit rates for all GOBs encoded up to the previous GOB within the current frame, m is the total number of GOBs from a first GOB to the current GOB within the current frame, and g is the total number of GOBs within the current frame.

Preferably, $$B_{newtarget} \text{ equals } B_{target} - \frac{bit\_diff}{b}$$

where $B_{newtarget}$ is a newly-set target bit rate, b is the total number of GOBs up to the last GOB after the current GOB within the current frame, and $$bit\_diff = \sum_{k=1}^{m-1} B_k^n - \frac{m-1}{g} B_{target}$$

which is a difference value between the sum total of the encoding bit rate encoded up to the previous GOB within the current frame and a value obtained by multiplying the number of previous GOBs of the current frame by a value that is obtained by dividing a target bit rate of the current frame by the total number of GOBs of the current frame.

In another embodiment of the present invention, a method for encoding a signal of a wireless communication system comprises dividing a current frame of the signal into a plurality of GOBs (Groups of Blocks) each having a certain size, determining whether a current GOB to be encoded of the plurality of GOBs is a first GOB of the current frame, calculating a control parameter value of the current GOB based on a control parameter value of a first GOB of a previous frame of the signal if it is determined that the current GOB is the first GOB of the current frame, calculating the control parameter value of the current GOB based on a control parameter value of a previous GOB of the current frame if it is determined that the current GOB is not the first GOB of the current frame, controlling an encoding bit rate of the current GOB according to the control parameter value, and encoding the current GOB.

In one aspect of the invention, the method further comprises updating a difference value between a total bit rate assigned to the current GOB and a target bit rate, updating the target bit rate, determining whether the current GOB is the last GOB of the current frame, and determining whether the current frame is the last frame of the signal if the current GOB is determined to be the last GOB of the current frame.

Preferably, the signal is a video signal. The control parameter is a Lagrange multiplier. The control parameter value corresponding to the first GOB of a first frame of the signal is arbitrarily assigned.

In another aspect of the invention, the encoding bit rate of the current GOB is controlled according to the equation $$\lambda_1^n = \lambda_1^{n-1} + \left( \frac{B_1^{n-1}}{B_{target}/g} - 1 \right)$$

where $\lambda^n_1$ is the control parameter for encoding the first GOB of the current frame ($n^{th}$ frame), $B^{n-1}_1$ is the encoding bit rate obtained by encoding the first GOB of a previous frame (n–1$^{th}$ frame), $B_{target}$ is the target bit rate of the current frame, and g is the number of GOBs of the current frame.

Preferably, the bit rate of the current GOB is controlled according to the control parameter value of a previous GOB within the current frame, the sum total of encoding bit rates encoded up to the previous GOB and a difference value between the total encoding bit rate encoded up to the previous GOB and a total target bit rate assigned up to the current GOB, for thereby reducing a bit rate variation between successive encoded frames.

The bit rate of the current GOB is controlled according to the equation $$\lambda_m^n = \lambda_{m-1}^n + \left( \frac{\sum_{k=1}^{m-1} B_k^n}{\frac{m-1}{g} B_{newtarget}} - 1 \right)$$

where $\lambda_{m-1}^n$ is the control parameter value for encoding the previous GOB, $$\sum_{k=1}^{m-1} B_k^n$$

is the sum total of encoding bit rates for all GOBs encoded up to the previous GOB within the current frame, m is the total number of GOBs from a first GOB to the current GOB within the current frame, and g is the total number of GOBs within the current frame.

Preferably, $$B_{newtarget} \text{ equals } B_{target} - \frac{bit\_diff}{b}$$

where $B_{newtarget}$ is a newly-set target bit rate, b is the total number of GOBs up to the last GOB after the current GOB within the current frame, and $$bit\_diff = \sum_{k=1}^{m-1} B_k^n - \frac{m-1}{g} B_{target}$$

which is a difference value between the sum total of the encoding bit rate encoded up to the previous GOB within the current frame and a value obtained by multiplying the number of previous GOBs of the current frame by a value that is obtained by dividing a target bit rate of the current frame by the total number of GOBs of the current frame.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to a method for controlling an encoding bit rate of an image signal by using an inter-frame GOB update method and an intra-frame GOB update method when transmitting an image using user equipment (UE). UEs may also be referred to as mobiles, subscriber units, remote stations, and mobile terminals, for example.

Figure 3:
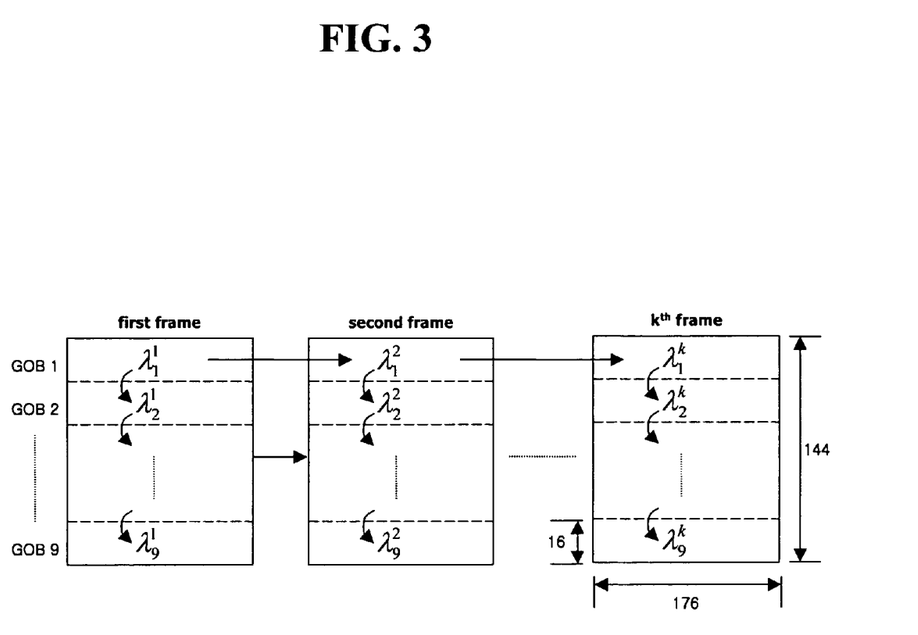
FIG. 3 is a diagram illustrating a method for updating the value of $\lambda$ for encoding an image signal in accordance with one embodiment of the present invention.

FIG. 3 is a diagram illustrating a method for updating a value of $\lambda$ of an image signal in accordance with one embodiment of the present invention. As shown, a 176-by-144 pixel-sized quarter common interchange format (QCIF) video image signal frame is divided into 176-by-16 pixel-sized GOBs (Groups of (Macro) Blocks).

A method for transmitting an image signal in the UE in accordance with one embodiment of the present invention adopts a hybrid method in which an inter-frame GOB update method and an intra-frame GOB update method are combined. Preferably, in the inter-frame GOB update method, the value of $\lambda$ for a first GOB of a current frame is determined based on a control parameter value ($\lambda$) for a first GOB of a previous frame. In the intra-frame GOB update method, the value of $\lambda$ for a current GOB is determined based on a value of $\lambda$ for a previous GOB within the same (current) frame to be transmitted.

As for $\lambda_m^n$, which is a control parameter value, superscript "n" represents an order of a frame to be transmitted, and subscript "m" represents an order of a GOB within a current frame.

The inter-frame GOB update method and the intra-frame GOB update method in accordance with one embodiment of the present invention will now be described in detail. The inter-frame GOB update method is a method of determining a value of $\lambda$ of a first GOB of a current frame by horizontally transferring a value of $\lambda$ corresponding to a first GOB of a previous frame to the first GOB of the current frame having almost the same characteristics as those of the previous frame.

The value of $\lambda$ corresponding to the first GOB of one frame is calculated according to the following equation.

$$\lambda_1^n = \lambda_1^{n-1} + \left( \frac{B_1^{n-1}}{B_{target}/g} - 1 \right). \qquad \text{equation (2)}$$

In equation 2, $B_1^{n-1}$ represents an encoding bit amount obtained by encoding the first GOB of the previous frame (n-1$^{th}$ frame). $B_{target}$ represents a target bit amount in the current frame and "g" represents the number of GOBs of the current frame.

Specifically, the value of $\lambda$ ($\lambda_1^n$) corresponding to the first GOB of the current frame (n$^{th}$ frame) is updated based on the value of $\lambda$ ($\lambda_1^{n-1}$) corresponding to the first GOB of the previous frame (n-1$^{th}$ frame), the encoding bit amount ($B_1^{n-1}$) obtained by encoding the first GOB of the n-1$^{th}$ frame and the target bit amount ($B_{target}$) of the current frame.

Also, in FIG. 3, a certain value is assigned arbitrarily as a control parameter value ($\lambda^1_1$) of the first frame. This is done so that even if the assigned value of $\lambda$ is not correct, an update can be made based on a correct value. Here, the correct value is a control parameter corrected while encoding is performed on the subsequent several GOBs.

The intra-frame GOB update method is a method of determining the value of $\lambda$ for a current GOB based on the value of $\lambda$ for a previous GOB within one corresponding frame.

Updating the value of $\lambda$ between GOBs within one frame is made in accordance with the following equation.

$$\text{bit\_diff} = \sum_{k=1}^{m-1} B_k^n - \frac{m-1}{g} B_{target}. \qquad \text{equation (3)}$$

In equation 3, "bit_diff" is the difference value between the sum total $$\left( \sum_{k=1}^{m-1} B_k^n \right)$$

of encoding bit rates encoded up to the previous GOB within the current frame, and a value obtained by multiplying the number of previous GOBs (m−1) of the current frame by a value obtained by dividing the target bit rate ($B_{target}$) of the current frame by the total number of GOBs (g) within the current frame.

Specifically, if $$\sum_{k=1}^{m-1} B_k^n$$

is greater than $$\frac{m-1}{g} B_{target},$$

then the total encoding bit rate used up to the previous GOB is greater than the target bit rate ($B_{target}$). In contrast, if $$\sum_{k=1}^{m-1} B_k^n$$

is smaller than $$\frac{m-1}{g} B_{target},$$

then the bit rate used up to the current GOB is smaller than the target bit rate ($B_{target}$).

A newly-set target bit rate $B_{newtarget}$ is obtained in accordance with the following equation (4) using the value of "bit_diff" obtained in equation (3).

$$B_{newtarget} = B_{target} - \frac{\text{bit\_diff}_{m-1}^n}{b}. \qquad \text{equation (4)}$$

In equation 4, where remaining to be encoded in the current frame, i.e., b represents the number of GOBs from the GOB that is subsequent up to the current GOB to the last GOB within the current frame. Preferably, the value of b is a constant for determining how many following GOBs will be used to compensate for a bit rate difference.

For example, if the value of b is 1, compensation for the entire bit rate difference generated up to the current GOB is set to be performed in the very next GOB. If the value of b is 5, compensation for the bit rate difference generated up to the current GOB is set to be performed by updating the value of $\lambda$ the next five times.

As a result, values of $\lambda$ from the second GOB of each frame are calculated per the following equation (5) on the basis of equations (3) and (4).

$$\lambda_m^n = \lambda_{m-1}^n + \left( \frac{\sum_{k=1}^{m-1} B_k^n}{\frac{m-1}{g} B_{target}} - 1 \right). \qquad \text{equation (5)}$$

In other words, the value of $\lambda$ applied for the first GOB of each frame is obtained by equation (2), and values of $\lambda$ to be applied for the respective GOBs from the second GOB to the last GOB of each frame are obtained by equation (5).

Figure 4:
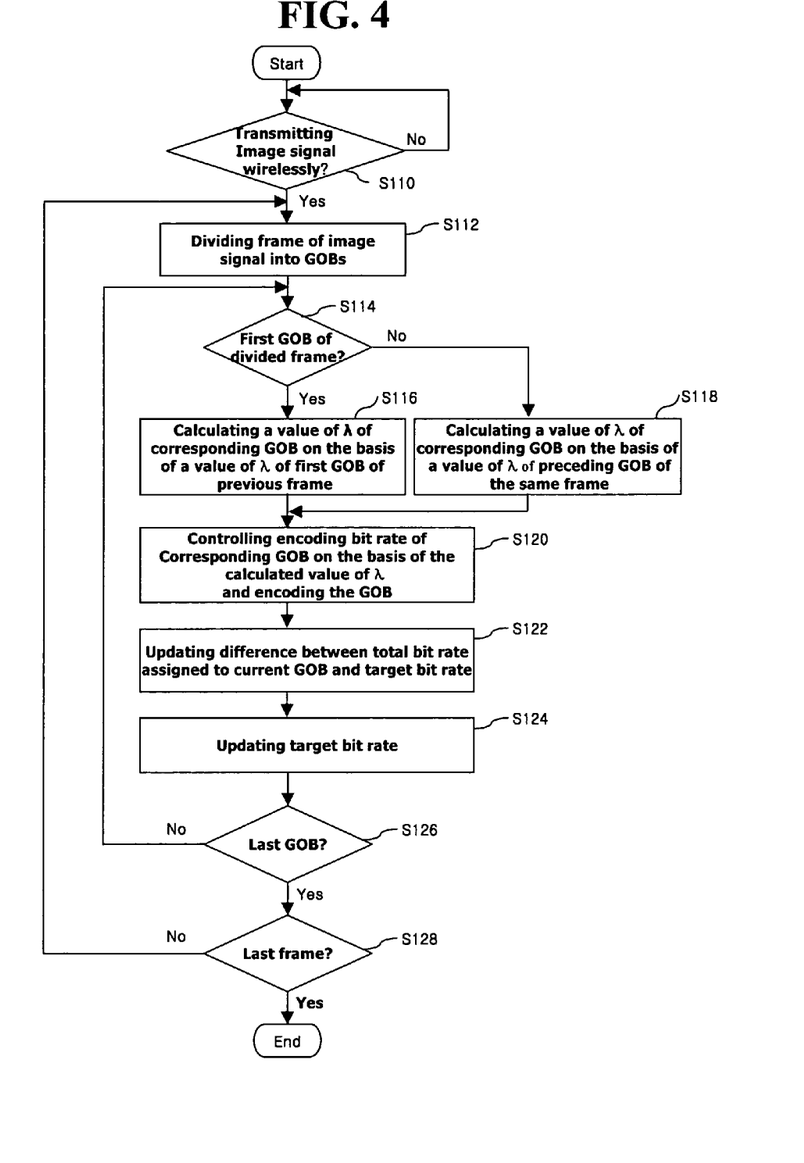
FIG. 4 is a flow chart illustrating a method for updating the value of $\lambda$ for encoding an image signal in accordance with one embodiment of the present invention.

FIG. 4 is a flow chart illustrating a method for updating the value of $\lambda$ when coding an image signal in accordance with one embodiment of the present invention. The method for updating the value of $\lambda$ for encoding an image signal will now be described in detail with reference to FIGS. 3 and 4.

Preferably, a certain predetermined value is assigned arbitrarily as the control parameter value ($\lambda$) corresponding to the first GOB of the first frame of an image signal to be encoded, such as when the image signal is be transmitted in a mobile communication system, for example.

When a user wirelessly transmits an image signal by using the UE, the UE divides a frame of an image to be transmitted into 176-by-16 pixel-sized GOBs (S110, S112).

Then, it is determined whether a GOB of the divided GOBs to be transmitted is the first GOB of the current frame (S114). If the determination result shows that the GOB is the first GOB, the value of $\lambda$ of the first GOB of the current frame is calculated using the control parameter value ($\lambda$) of the first GOB of the previous frame and the equation (2) (S116). If the determination result shows that the GOB is not the first GOB, the value of $\lambda$ of the corresponding GOB is calculated using the value of $\lambda$ of the previous GOB within the same frame and equation (5) (S118).

Accordingly, the calculated value of $\lambda$ is used as the value of $\lambda$ for the corresponding GOB, wherein the bit rate of the corresponding GOB is controlled on the basis of the calculated value of $\lambda$. The controlled GOB is then transmitted (S120).

By using equations (3) and (4), the difference value between the sum total $$\left( \sum_{k=1}^{m-1} B_k^n \right)$$

of the encoding bit rates encoded up to the previous GOB and the value $$\frac{m-1}{g} B_{target},$$

obtained by multiplying the number of previous GOBs of the current frame by the value obtained by dividing the target bit rate ($B_{target}$) by the total number of GOBs within the current frame, is updated (S122).

After the difference value between $$\sum_{k=1}^{m-1} B_k^n$$

and $$\frac{m-1}{g} B_{target}$$

is updated in the aforementioned step (S122), the target bit rate of the GOB of the current frame is set as the new target bit rate ($B_{newtarget}$) (S124). It is then determined whether the corresponding GOB is the last one (S126). If the determination result (S126) shows that the GOB is not the last one, the process returns to an operation step (S114), and the aforementioned steps (S114 to S124) are repeatedly performed. If it is determined that the GOB is the last one in the determination step (S126), it is then determined whether the current frame is the last one of the image signal being transmitted (S128).

If it is determined that the current frame is not the last frame in the determination step (S128), the process returns to the step (S112), and the aforementioned steps (S112 to S126) are repeatedly performed. If it is determined that the current frame is the last one, the transmission is completed since there are no more frames to transmit.

As described so far, in the method for encoding an image signal in the UE in accordance with the present invention, each frame of the image signal is divided into a plurality of GOBs, and the value of λ of the current GOB is obtained by using the first GOB of the previous frame or using the value of λ of the previous GOB of the current frame. To this end, the method uses a hybrid method in which an intra-frame GOB update method and an inter-frame GOB update method are combined. Since the hybrid method is used, the bit rate change between frames is remarkably reduced, data transmission of an occupying channel can be efficiently used, and optimum image quality is secured.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for encoding a signal of a wireless communication system, the method comprising:
dividing a current frame of the signal into a plurality of GOBs (Groups of Blocks) each having a certain size;
determining whether a current GOB to be encoded of the plurality of GOBs is a first GOB of the current frame;
calculating a control parameter value of the current GOB according to whether the current GOB is the first GOB of the current frame;
controlling an encoding bit rate of the current GOB according to the control parameter value; wherein the encoding bit rate of the current GOB is controlled according to the equation $$\lambda_1^n = \lambda_1^{n-1} + \left( \frac{B_1^{n-1}}{B_{target}/g} - 1 \right)$$

where $\lambda_1^n$ is the control parameter for encoding the first GOB of the current frame ($n^{th}$ frame), $B_1^{n-1}$ is the encoding bit rate obtained by encoding the first GOB of a previous frame ($n-1^{th}$ frame), $B_{target}$ is the target bit rate of the current frame, and g is the number of GOBs of the current frame; and encoding the current GOB.

2. The method of claim 1, wherein the control parameter value of the current GOB is calculated based on a control parameter value of a first GOB of a previous frame of the signal if it is determined that the current GOB is the first GOB of the current frame.

3. The method of claim 1, wherein the control parameter value of the current GOB is calculated based on a control parameter value of a previous GOB of the current frame if it is determined that the current GOB is not the first GOB of the current frame.

4. The method of claim 1, further comprising:
updating a difference value between a total bit rate assigned to the current GOB and a target bit rate; and
updating the target bit rate.

5. The method of claim 4, further comprising:
determining whether the current GOB is the last GOB of the current frame; and
determining whether the current frame is the last frame of the signal if the current GOB is determined to be the last GOB of the current frame.

6. The method of claim 1, wherein the signal is a video signal.

7. The method of claim 1, wherein the control parameter is a Lagrange multiplier.

8. The method of claim 1, wherein the control parameter value corresponding to the first GOB of a first frame of the signal is arbitrarily assigned.

9. The method of claim 1, wherein the bit rate of the current GOB is controlled according to the control parameter value of a previous GOB within the current frame, the sum total of encoding bit rates encoded up to the previous GOB and a difference value between the total encoding bit rate encoded up to the previous GOB and a total target bit rate assigned up to the current GOB, for thereby reducing a bit rate variation between successive encoded frames.

10. The method of claim 9, wherein the bit rate of the current GOB is controlled according to the equation $$\lambda_m^n = \lambda_{m-1}^n + \left( \frac{\sum_{k=1}^{m-1} B_k^n}{\frac{m-1}{g} B_{newtarget}} - 1 \right)$$

where $\lambda^n_{m-1}$ is the control parameter value for encoding the previous GOB, $$\sum_{k=1}^{m-1} B_k^n$$

is the sum total of encoding bit rates for all GOBs encoded up to the previous GOB within the current frame, m is the total number of GOBs from a first GOB to the current GOB within the current frame, and g is the total number of GOBs within the current frame.

11. The method of claim 10, wherein $$B_{newtarget} \text{ equals } B_{target} - \frac{bit\_diff}{b}$$

where $B_{newtarget}$ is a newly-set target bit rate, b is the total number of GOBs up to the last GOB after the current GOB within the current frame, and $$bit\_diff = \sum_{k=1}^{m-1} B_k^n - \frac{m-1}{g} B_{target}$$

which is a difference value between the sum total of the encoding bit rate encoded up to the previous GOB within the current frame and a value obtained by multiplying the number of previous GOBs of the current frame by a value that is obtained by dividing a target bit rate of the current frame by the total number of GOBs of the current frame.

12. A method for encoding a signal of a wireless communication system, the method comprising:
dividing a current frame of the signal into a plurality of GOBs (Groups of Blocks) each having a certain size;
determining whether a current GOB to be encoded of the plurality of GOBs is a first GOB of the current frame;
calculating a control parameter value of the current GOB based on a control parameter value of a first GOB of a previous frame of the signal if it is determined that the current GOB is the first GOB of the current frame;
calculating the control parameter value of the current GOB based on a control parameter value of a previous GOB of the current frame if it is determined that the current GOB is not the first GOB of the current frame;
controlling an encoding bit rate of the current GOB according to the control parameter value; wherein the encoding bit rate of the current GOB is controlled according to the equation $$\lambda_1^n = \lambda_1^{n-1} + \left( \frac{B_1^{n-1}}{B_{target}/g} - 1 \right)$$

where $\lambda^n_1$ is the control parameter for encoding the first GOB of the current frame ($n^{th}$ frame), $B^{n-1}_1$ is the encoding bit rate obtained by encoding the first GOB of a previous frame (n–$1^{th}$ frame), $B_{target}$ is the target bit rate of the current frame, and g is the number of GOBs of the current frame; and encoding the current GOB.

13. The method of claim 12, further comprising:
updating a difference value between a total bit rate assigned to the current GOB and a target bit rate; and
updating the target bit rate.

14. The method of claim 13, further comprising:
determining whether the current GOB is the last GOB of the current frame; and
determining whether the current frame is the last frame of the signal if the current GOB is determined to be the last GOB of the current frame.

15. The method of claim 12, wherein the signal is a video signal.

16. The method of claim 12, wherein the control parameter is a Lagrange multiplier.

17. The method of claim 12, wherein the control parameter value corresponding to the first GOB of a first frame of the signal is arbitrarily assigned.

18. The method of claim 12, wherein the bit rate of the current GOB is controlled according to the control parameter value of a previous GOB within the current frame, the sum total of encoding bit rates encoded up to the previous GOB and a difference value between the total encoding bit rate encoded up to the previous GOB and a total target bit rate assigned up to the current GOB, for thereby reducing a bit rate variation between successive encoded frames.

19. The method of claim 18, wherein the bit rate of the current GOB is controlled according to the equation $$\lambda_m^n = \lambda_{m-1}^n + \left( \frac{\sum_{k=1}^{m-1} B_k^n}{\frac{m-1}{g} B_{newtarget}} - 1 \right)$$

where $\lambda^n_{m-1}$ is the control parameter value for encoding the previous GOB $$\sum_{k=1}^{m-1} B_k^n$$

is the sum total of encoding bit rates for all GOBs encoded up to the previous GOB within the current frame, m is the total number of GOBs from a first GOB to the current GOB within the current frame, and g is the total number of GOBs within the current frame.

20. The method of claim 19, wherein $$B_{newtarget} \text{ equals } B_{target} - \frac{\text{bit\_diff}}{b}$$

where $B_{newtarget}$ is a newly-set target bit rate, b is the total number of GOBs up to the last GOB after the current GOB within the current frame, and $$\text{bit\_diff} = \sum_{k=1}^{m-1} B_k^n - \frac{m-1}{g} B_{target}$$

which is a difference value between the sum total of the encoding bit rate encoded up to the previous GOB within the current frame and a value obtained by multiplying the number of previous GOBs of the current frame by a value that is obtained by dividing a target bit rate of the current frame by the total number of GOBs of the current frame.

* * * * *